Dec. 8, 1964   B. C. MATHEWS   3,159,957
ROTARY SCYTHE
Filed July 5, 1962   2 Sheets-Sheet 1
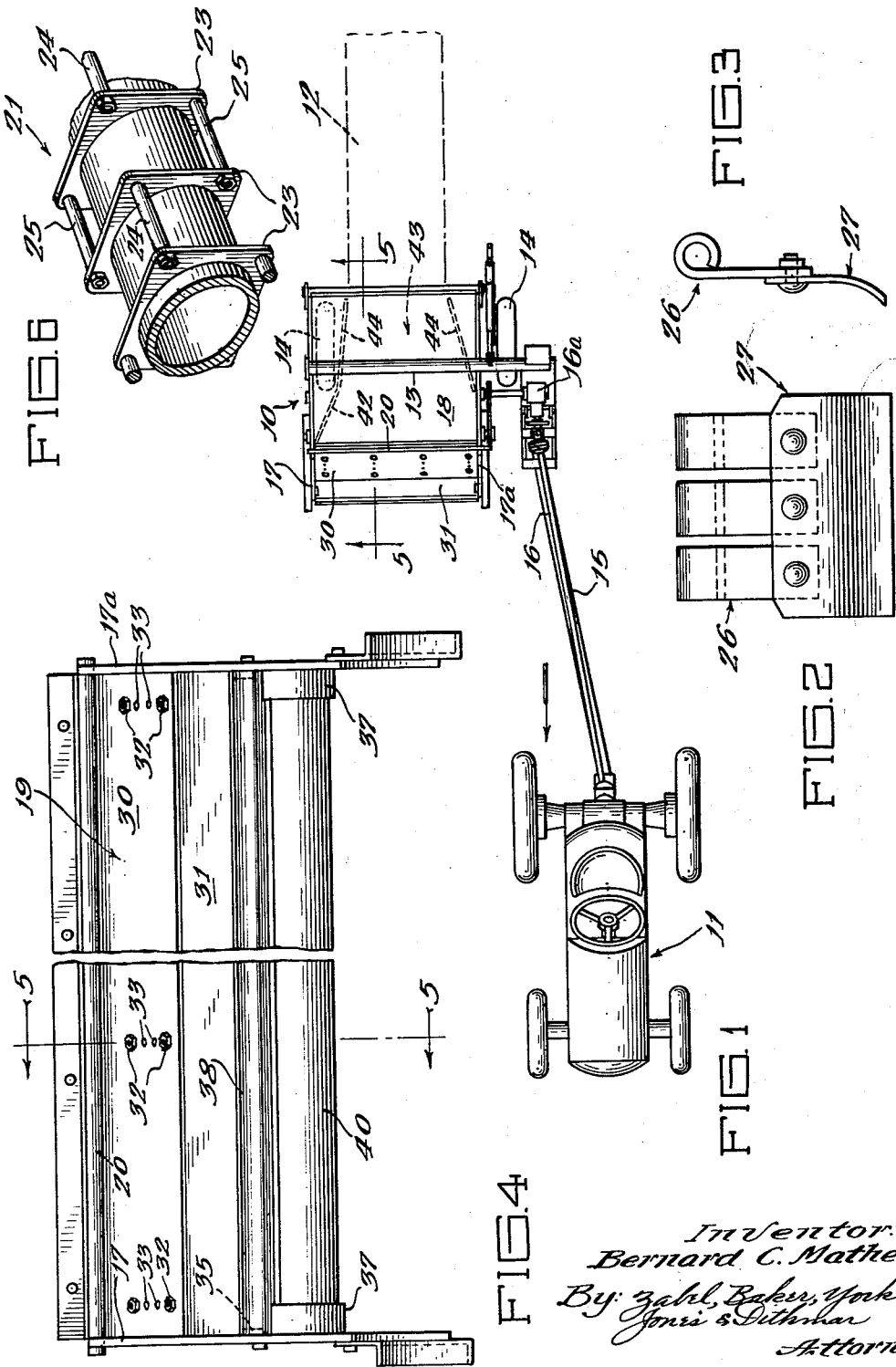
Inventor:
Bernard C. Mathews
By: Zabel, Baker, York,
Jones & Dithmar
Attorneys

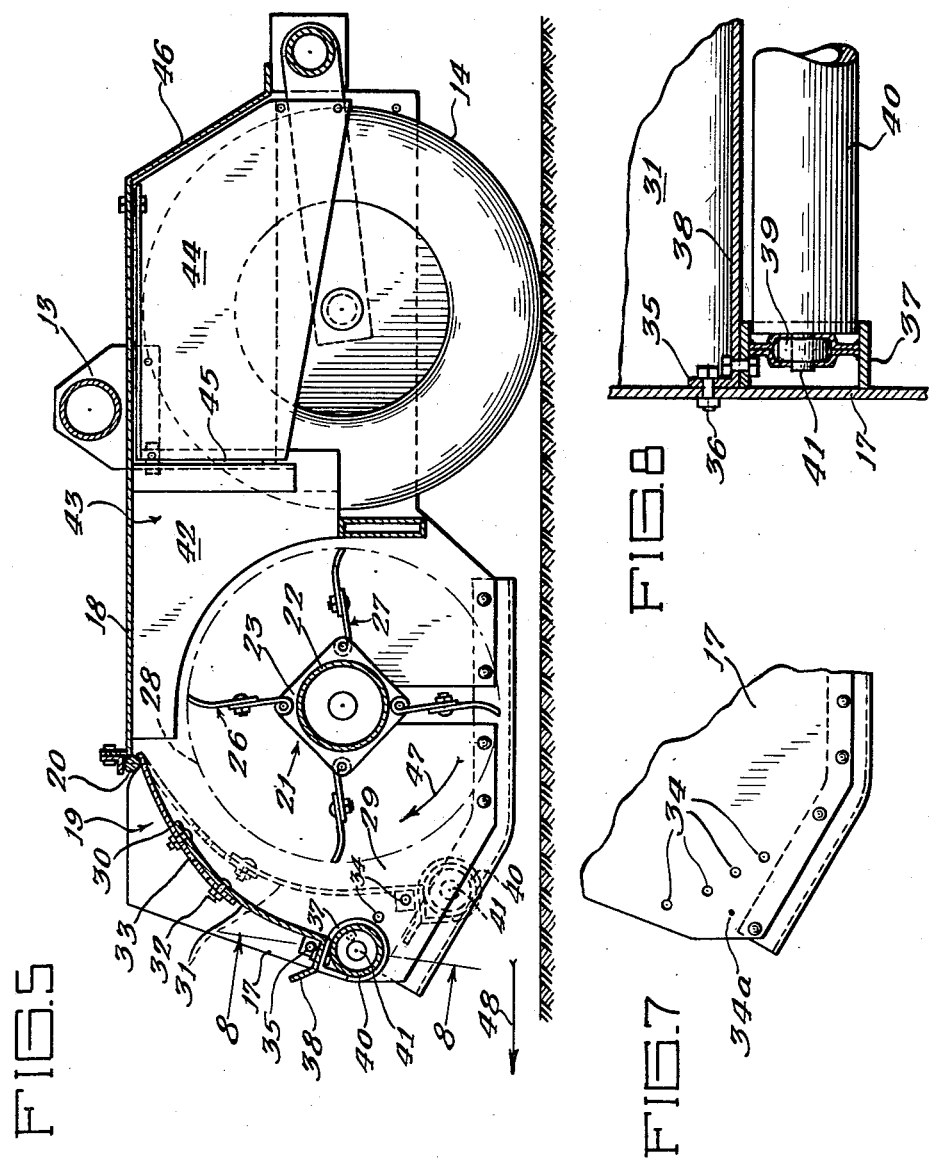

United States Patent Office 3,159,957
Patented Dec. 8, 1964

3,159,957
ROTARY SCYTHE
Bernard C. Mathews, Box 202, Crystal Lake, Ill.
Filed July 5, 1962, Ser. No. 207,594
11 Claims. (Cl. 56—24)

This invention relates to a rotary scythe for cutting hay and like crops and is distinguished by the fact that it cuts the plant without chopping the same into small pieces.

The present application is a continuation-in-part of my copending application, Serial No. 86,471, filed February 1, 1961, now Patent No. 3,092,946.

When the plant is chopped and redeposited on the ground to dry, the small pieces sink into the stubble from which they cannot readily be picked up; this is particularly true of the leaves which are the most nourishing part of the crop.

It is an object of my invention to provide a device which cuts the crop and also conditions it for more rapid drying, the conditioning being due to a certain "crimping" of the plant stem which accelerates the drying process.

My invention also provides means for depositing the cut crop on the ground in windrows, and in this connection the crimps in the plant stems render the deposit of plants fluffy, which promotes air circulation and more rapid drying.

It is a further object to provide a rotary or flail type of device which cuts and conditions without chopping and without leaf stripping.

Flail type devices have been used for chopping. As pointed out in the aforesaid copending application, I have found that if the clearance between the blade path and the upper front wall of the machine is increased, and if the plant is bent forwardly when the stem is initially severed, and the cutter bar eliminated, that chopping and leaf stripping can be avoided. The aforesaid clearance is referred to herein as the "throat" of the machine, and the plant bending means as the "deflector."

I have now further found that attainment of the above objects not only requires an optimum throat width which varies in accordance with the thickness of the crop stand, but also an optimum deflector elevation which varies with the crop stand thickness and the plant height. In other words, I have discovered that there is a certain correlation between throat width and deflector elevation in accordance with the thickness and height of the crop stand.

It is another object of my invention to provide an improved mower and conditioner which can be adjusted for use on both thick stands and thin stands of crop.

I have also found that improved results are obtained if the plant friction is minimized. Plant friction arises from the entanglement of the leafy portions of the plants with each other, as the cut plants are pulled away from the uncut plants, and also from the friction between the trailing edges of the plants and the surface of the deflector member. Both of these aspects of plant friction are a function of the elevation of the deflector.

A further object is to provide an improved deflector which materially reduces plant friction.

Other objects, features and advantages of my invention will become apparent as the description proceeds.

With reference now to the drawings in which like reference numerals designate like parts:

FIG. 1 is a plan view of a preferred embodiment of my invention showing also its offset relationship with respect to the tractor which pulls it through the standing crop;

FIGS. 2 and 3 are elevation and end views, respectively, of the swingles or cutting elements;

FIG. 4 is a front elevation of the housing of the rotary scythe, the swingles and certain frame elements being omitted for clarity;

FIG. 5 is an enlarged longitudinal section taken along lines 5—5 of FIGS. 1 and 4, and showing a changed position of the cover in dotted lines;

FIG. 6 is a perspective view of a portion of the rotor assembly;

FIG. 7 is a fragmentary elevation of the side wall, showing the hole arrangement; and FIG. 8 is an enlarged vertical section taken along the line 8—8 of FIG. 5.

In FIG. 1, the rotary scythe 10 is pulled by a tractor 11 in an offset relationship, and the conditioned hay is deposited in a windrow 12, shown in dotted lines.

The rotary scythe 10 comprises a suitable frame 13 which is mounted on two wheels 14 and which includes a draw bar 15 which is removably connected to the tractor 11. A drive shaft 16 also extends from the usual power take-off of the tractor 11 to the rotary scythe 10 and drives a rotor assembly 21 through suitable gearing 16a or the like.

The rotary scythe 10 also includes the side walls 17 and 17a (FIG. 4), a top wall 18, and a cover 19 which is hingedly connected to the front edge of the top wall 18 by means of a hinge rod 20. The walls 17, 17a and 18 are structural elements being made of steel plate. The side walls 17 and 17a and the cover 19 provide a housing for the rotor assembly 21, the cover 19 forming the front wall.

The rotor assembly 21 includes a tubular shaft or drum 22 which is suitably journalled in the side walls 17 and 17a and on which are welded or otherwise secured a plurality of plates 23, to provide a rigid rotating structure. The first and second plates 23 are connected to each other by two bolts 24 located in the zero and 180 degree positions, and the same arrangement pertains with respect to the third and fourth plates, the fifth and sixth etc. Connecting the second and third plates, the fourth and fifth etc., are bolts 25 which are located in the 90 degree and 270 degree positions. Each of the bolts 24 and 25 supports a swingle 26 shown in FIGS. 2 and 3, and which is characterized by having a curved blade 27 which is preferably replaceable. Thus, the rotor assembly 21 includes a plurality of pairs of swingles located 180 degrees apart, but adjacent pairs of swingles are offset from each other by 90 degrees.

The rotor assembly 21 is driven from the drive shaft 16 in the direction shown by the arrow 47, so that it rotates into the crop as the rotary scythe advances in the direction of the arrow 48.

As shown in FIG. 5, the path of the tips of the blades 27 is indicated by a broken line 28; the distance between the blade path 28 and the hinged cover 19 constitutes the previously mentioned throat 29. Due to the hinged connection 20, the width of this throat is adjustable in accordance with the thickness of the particular stand of crop, as above pointed out.

The hingedly mounted cover 19 is made in two parts, preferably of sheet metal, and is curved to conform generally, although not exactly, to the curved line of the blade path 28. More specifically, the cover 19 comprises a curved upper part 30 and a curved lower part 31 which are adjustably secured to each other by screws 32 which extend through openings 33, either separate or in the form of slots. A series of holes 34 are provided in each of the side walls 17 and 17a, and the lower part 31 is provided with apertured lugs 35 which can register with one or the other of each pair of holes 34 and be secured thereto by means of bolts 36.

Thus, the arrangement provides a two-way adjustment for the cover 19. As indicated in FIG. 5 when the throat 29 is wide, the lower end of the cover is in an elevated position, but when the cover is moved downwardly to narrow the throat 29, the cover is elongated so that the lower end is at a lesser elevation than in the solid line position shown.

The plant deflector is in the form of a roller 40. This roller is mounted on the lower cover part 31 by means of collars 37 located immediately beneath the lugs 35 and which are secured to a flange 38 of the cover part 31. Suitable ball bearing units 39 are located in the collars 37 and receive the reduced ends 41 of the roller 40.

Located rearwardly of the rotor assembly 21 is a diagonally disposed side sheet 42 which cooperates with the top wall 18 and the side wall 17a to form the front portion of a transversely tapering open bottomed duct 43 which is located between the wheels 14. The rear portion of the duct 43 is provided with side sheets in the form of adjustable wings 44, by means of which the width of the windrow 12 can be controlled. A hinged connection 45 is provided between the elements 42 and 44 on one side, as shown in FIG. 5, and a similar hinged connection can be provided between the wall 17a and the other wing 44.

A baffle 46 is located at the rear end of the duct 43, and preferably extends for the full width of the machine.

In operation, as the machine advances into the crop, the plants will be engaged by the roller and deflected forwardly. Thus, the leafy portions of the plant are maintained away from the blade path at the time that the stem is severed. The severed stem is engaged by the blade and lifted into the throat, and this pulls the leafy portion of the plant under the roller, with the result that the plant is inverted and goes through the throat 29 stem first.

It is not necessary to drive the roller 40; it is maintained in rotation by the friction of the plants engaged thereby. However, this friction is much less than the friction that would occur if the plants were dragged over a non-rotating surface. Furthermore, the rotation of the roller materially facilitates the separation of the entangled leafy portions of the plants, thus reducing plant friction and permitting rapid acceleration of the plant. Under conditions of high plant friction, successive portions of the stem would be severed and the drag on the stem incident to separation would strip the leaves. According to my invention, the blades put one or two crimps in the stem as it is being inverted and drawn into the throat, and the plant as a whole is engaged by the blades one or more times as it passes through the throat, resulting in further crimping. Furthermore, by virtue of the relatively low plant friction, no leaf stripping occurs during plant separation.

Although the cut plants become separated from the uncut plants as they pass under the roller 40, the cut plants are not necessarily separated from each other. Rather, they move into the throat in the form of an attenuated mat, but the attenuation or extent of separation increases as the plants pass through the throat and as the plant speed increases.

The crimped plants are moving at a relatively high speed as they leave the throat, and they may be returned to the ground in any suitable manner. Due to the crimping, the deposited plants form a light and fluffy windrow which promotes rapid drying.

In the arrangement shown, the plants move horizontally through the open bottomed duct 43 at great speed, and engage the baffle 46. The momentum of the plants causes the plants to bend at the crimps, thus increasing the fluffiness of the deposit. From the baffle, the plants drop to the ground in a random manner. The width of the windrow 12 is regulated by adjusting the wings 44.

In mowing a thick crop stand, the bolts 35 are engaged in the uppermost hole 34 to provide a wide throat 29 and high roller elevation. A thinner crop stand would call for one of the lower holes 34, providing a narrower throat and a lower roller elevation, depending also on the height of the crop. The arrangement of the holes 34 can be varied; for instance, with a very low and a very thick stand, a hole located at point 34a, for instance, would be desirable, but I have found that all other combinations of crop height and stand thickness can be accommodated satisfactorily by the four hole arrangement shown in FIG. 7.

According to my invention, the throat width is quite substantial, being of the order of several inches.

As an example of dimensions which have been found to be satisfactory, the minimum throat width can vary from two inches to five inches, depending upon the thickness of the crop stand. This is the distance between the surface of the roller 40 and the blade path 28. The roller elevation can vary from five inches to twelve inches, this distance referring to the height of the bottom of the roller surface above the ground. A four inch roller diameter has been found to provide the desired low plant friction.

The present arrangement makes it possible to obtain this range of variation in both throat width and roller elevation by a single adjustment of the cover 19.

One advantage of the offset swingle arrangement is that the blades 27 can be of a width greater than the width of bolts 24 or 25 on which the swingles 26 are mounted. Thus, the side edges of each blade overlap the side edges of the blades mounted on the adjacent swingles. As a result, there is no opportunity for adjacent blades to straddle a given plant which would result in leaf stripping.

Although only a preferred embodiment of my invention is shown and described herein, it will be understood that various modifications and changes may be made in the construction shown without departing from the spirit of my invention as pointed out in the appended claims.

I claim:

1. A rotary scythe comprising a rotor assembly mounted on a horizontal axis and including crop cutting blades, a housing for said rotor assembly having side walls, a top wall, and a curved front wall hingedly connected to said top wall, the clearance between said front wall and the path of said blades providing a throat, a plant deflector having a portion located forwardly of the lower end of said front wall, means for adjusting the lower end of said hinged front wall to regulate the width of said throat, and means for adjusting the elevation of said plant deflector above the ground.

2. A rotary scythe comprising a rotor assembly mounted in a horizontal axis and including crop cutting blades, a housing for said rotor assembly having side walls, a top wall, and a front wall hingedly connected at its upper end to said top wall, the clearance between said front wall and the path of said blades providing a throat, means for adjusting the lower end of said hinged front wall to regulate the width of said throat, a plant deflecting roller located near the lower edge of said hinged front wall, and means for adjustably mounting said roller in order to regulate the elevation of said roller above the ground.

3. A rotary scythe comprising a rotor assembly mounted on a horizontal axis and including crop cutting blades, a housing having side walls and a top wall, a curved wall member hingedly mounted on said top wall and space forwardly of said rotor assembly, the clearance between said wall member and the path of said blades providing a throat, a plant deflector mounted on said curved wall member at the lower end thereof, and means for adjusting the lower end of said curved wall member to regulate the width of said throat and the elevation of said plant deflector above the ground.

4. A rotary scythe as claimed in claim 3 in which said plant deflector comprises a roller.

5. A rotary scythe as claimed in claim 3 in which said curved wall member includes an extensible joint so that the limits of variation in deflector elevation may exceed the limits of variation in throat width.

6. A rotary scythe as claimed in claim 3 in which said curved wall member comprises an upper part and a lower part arranged in partially overlapping relationship, and means for securing said upper and lower parts to each other in such a manner that the extent of overlap can be regulated so that said curved wall member is extensible.

7. A rotary scythe as claimed in claim 6 in which said lower part is provided with spaced bearings at the side edges thereof, and in which said plant deflector comprises a roller mounted in said bearings for free rotation.

8. A rotary scythe as claimed in claim 6 in which said side walls extend forwardly beyond the side edges of said curved wall member, said side walls having a series of oppositely disposed pairs of holes corresponding to different combinations of throat width and deflector elevation, and fastening means for selectively securing a portion of said lower cover part to said side walls at one or the other of said pairs of holes.

9. A rotary scythe as claimed in claim 3 in which the width of said throat at the narrowest point is at least two inches, and in which the elevation of said plant deflector above the ground is from five to twelve inches.

10. A rotary scythe as claimed in claim 3 in which said blades are pivotally mounted on said rotor assembly.

11. A rotary scythe as claimed in claim 3 in which said rotor includes a plurality of swingles which are arranged in two rows which are spaced from each other by 180°, adjacent swingles of a given row being angularly offset from each other by 90°, the width of said blades being such that the side edge of one blade overlaps the side edge of a blade mounted on an adjacent and 90° angularly offset swingle.

References Cited by the Examiner

UNITED STATES PATENTS

| | | | |
|---|---|---|---|
| 2,674,081 | 4/54 | Hansen | 56—24 X |
| 3,043,080 | 7/62 | Mott | 56—24 XR |
| 3,092,946 | 6/63 | Mathews | 56—24 |

FOREIGN PATENTS

| | | |
|---|---|---|
| 230,088 | 8/60 | Australia. |
| 1,266,404 | 5/61 | France. |
| 1,098,275 | 1/61 | Germany. |
| 873,713 | 7/61 | Great Britain. |

T. GRAHAM CRAVER, *Primary Examiner.*

RUSSELL R. KINSEY, *Examiner.*